UNITED STATES PATENT OFFICE.

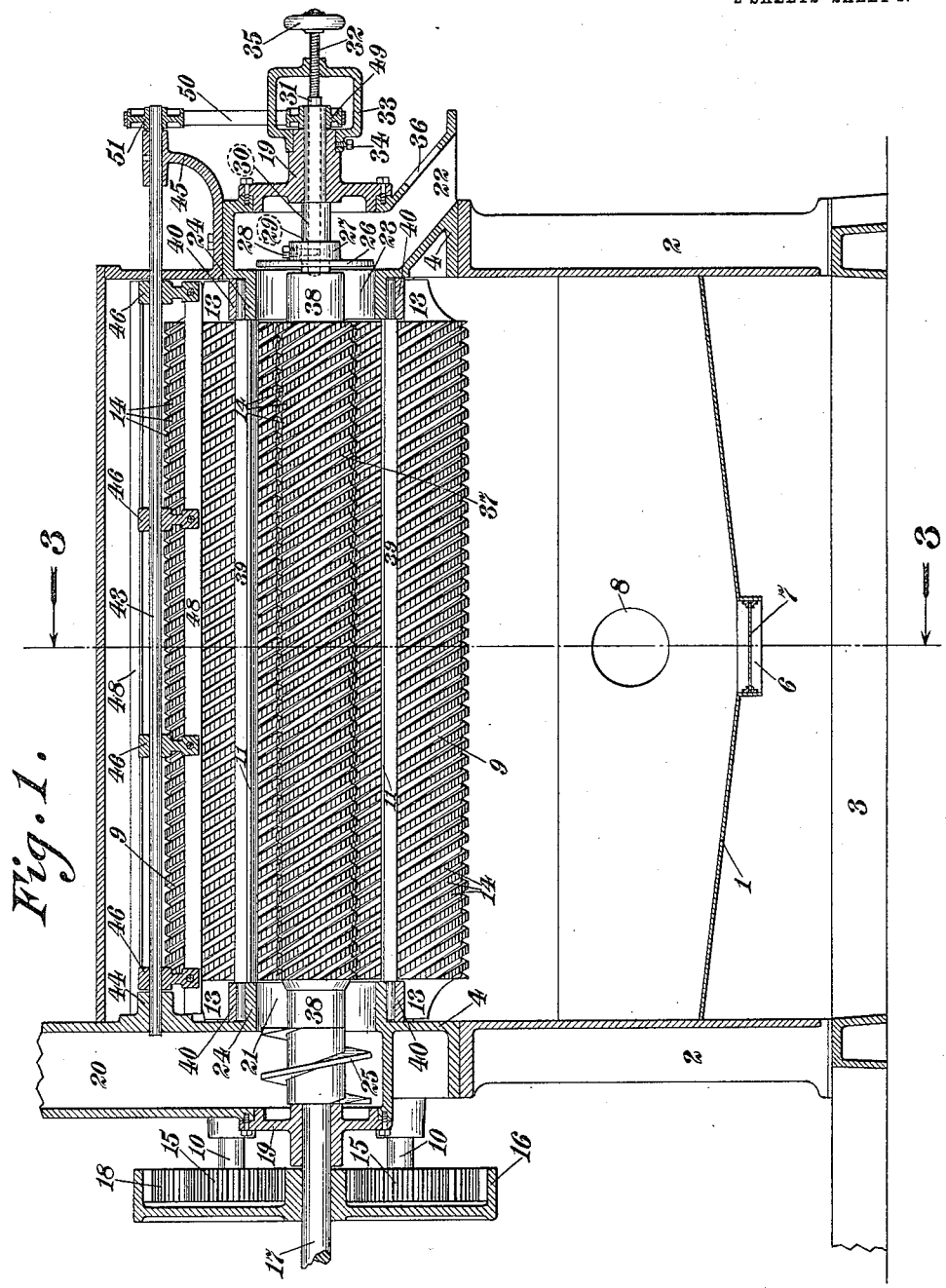

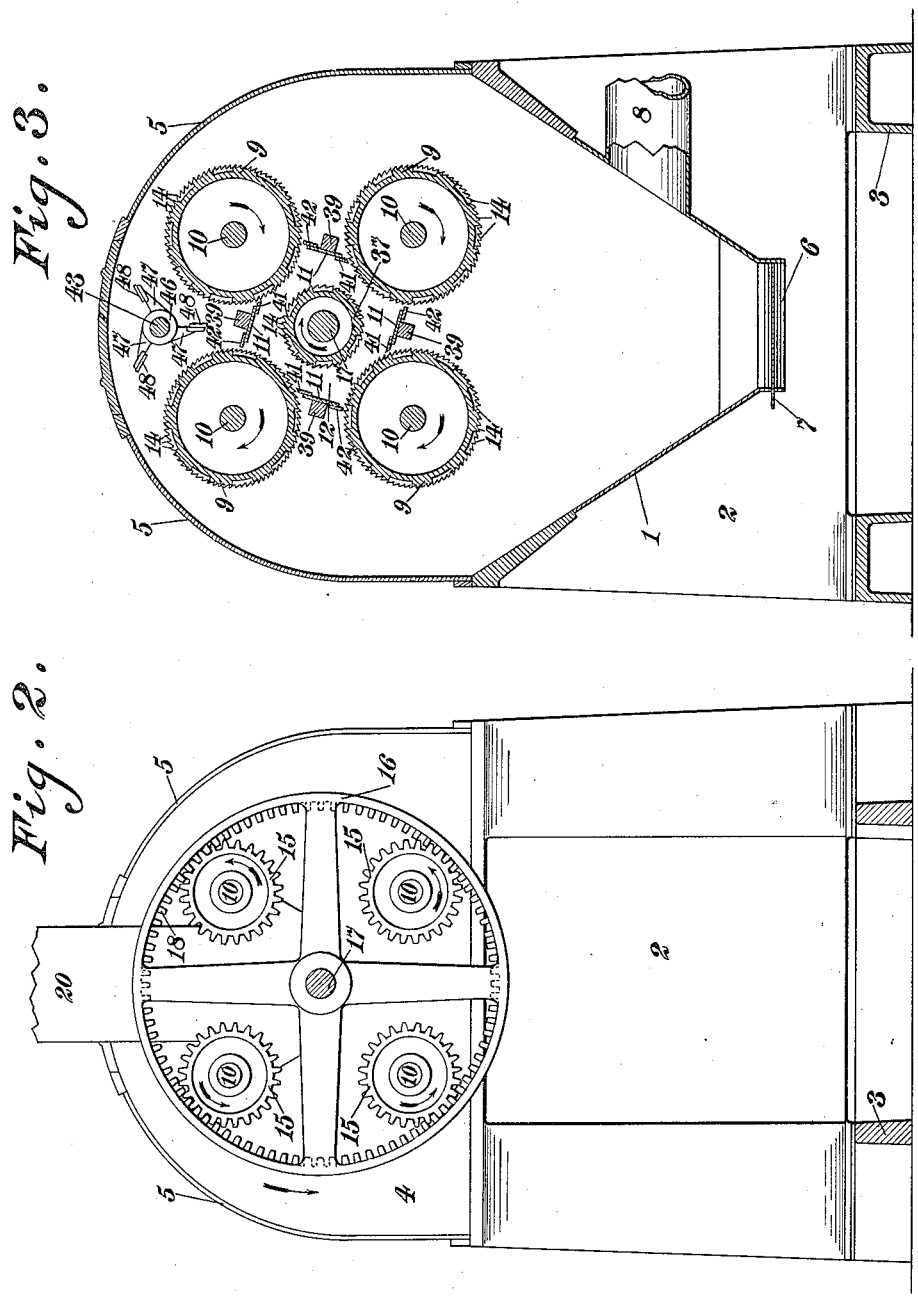

JOSEPH D. MULLEN, OF ST. LOUIS, MISSOURI, ASSIGNOR TO TEXAS DELINTER COMPANY, LIMITED, OF SHREVEPORT, LOUISIANA, A CORPORATION OF LOUISIANA.

DELINTER.

1,064,523.     Specification of Letters Patent.     Patented June 10, 1913.

Application filed April 24, 1912. Serial No. 692,763.

*To all whom it may concern:*

Be it known that I, JOSEPH D. MULLEN, a citizen of the United States, residing at the city of St. Louis and State of Missouri, have invented certain new and useful Improvements in Delinters, (Case B,) of which the following is a specification.

This invention relates to cotton-seed delinters, and has for its object to provide novel improvements in the machine which constitutes the subject-matter of another application filed by me of even date.

With this object in view, the present invention consists of the novel features of construction and arrangement of parts, as will be hereinafter more fully described and pointed out in the claims.

In the accompanying drawings forming part of this specification, in which like numbers of reference denote like parts wherever they occur, Figure 1 is a longitudinal sectional view of a delinter embodying the present invention; Fig. 2 is an end elevation of same; and Fig. 3 is a sectional view on the line 3—3, Fig. 1.

The casing 1 contains the delinting mechanism, and is supported by standards 2 which may be supported on a suitable base 3. The ends of the casing 1 are closed by heads or castings 4, which may be supported on standards 2, and the top of said casing is closed by a cover plate 5 or a plurality of such cover plates, which may be detachably secured in place by any suitable means, so that either one or all of said plates may be removed, in order to permit ready access to the interior of the machine for the purpose of cleaning or repairing same or for any other purpose. The bottom of said casing 1 is preferably hopper-shaped and is provided with an outlet 6 which is controlled by a gate or valve 7 of any suitable construction, the purpose of said outlet being to allow any seeds that may fall into the bottom of said casing to be removed, when gate 7 is opened. A suction pipe 8, connected to the lower part of the casing 1, is adapted to draw the lint from the interior of said casing and is connected with any suitable source of suction supply (not shown).

The delinting cylinders 9 are preferably arranged so that their axes of rotation are substantially horizontal within the casing 1, the shafts 10, which support said cylinders, being journaled in openings in the heads 4. Said cylinders 9 are preferably spaced apart symmetrically, and between each two adjacent cylinders a stationary stave 11 is located, the purpose of this arrangement being to form a delinting chamber 12, the walls of which are the delinting cylinders 9 and the staves 11. Each cylinder 9 is preferably formed of a metal tube which is screw-threaded externally and the ends of said cylinder are secured to suitable heads 13 which are rigidly mounted on its supporting shaft 10, the periphery of the screw-threads being serrated, so as to form teeth 14 which are adapted to remove the lint and fibers from the seeds that come in contact with said cylinder. The screw-threads are preferably formed with a relatively large pitch and the cylinders 9 are rotated in such direction that the screw-threads thereon will have a tendency to feed the seeds from the receiving end to the discharge end of the delinting chamber.

At one end of the machine, each shaft 10 projects from the head 4 and bears a gear 15. A wheel 16 on drive shaft 17, which receives its power from any suitable source, bears an internal gear 18 which meshes with and drives the gears 15 on shafts 10, so as to cause the cylinders 9 to rotate in the same direction as said drive shaft, as indicated by the arrows Fig. 3. The drive shaft 17 extends longitudinally through substantially the middle of the delinting chamber 12, and is arranged to extend substantially horizontal and parallel to the shafts 10, being journaled in bearings 19 which are bolted or otherwise secured to the heads 4. An inlet spout 20 communicates with one end of the delinting chamber 12 through an opening 21 in the head 4 at one end of the machine, and a discharge spout 22 communicates with the other end of the delinting chamber 12 through an opening 23 in the other head 4, said openings 21 and 23 being surrounded by flanges 24 borne by said heads 4. The shaft 17 extends through the inlet spout 20 and bears an Archimedean screw 25 or the like, which is adapted to rotate with said shaft, in order to feed the seeds from said spout 20 into the delinting chamber 12 through the opening 20. Said shaft 17 extends, also, through the discharge spout 22 and has a valve 26 reciprocatively mounted thereon for the purpose of controlling the passage of the delinted seeds through the opening 23 from the delinting chamber 12 into the discharge spout 22, said valve being preferably disk-shaped and being substantially the same size and having the same shape as the opening 23.

A sleeve 27 borne by valve 26 encircles shaft 17 and contains a screw-threaded opening to receive a bolt or screw 28. Said bolt or screw 28 is preferably screw-threaded only along a portion of its length, in order to fit in the screw-threaded opening in sleeve 27, and the end portion of said bolt or screw is left smooth and extends through an elongated slot 29 in shaft 17, which slot communicates with an opening 30 that extends longitudinally in the end of said shaft 17. The end of the bolt or screw 28 projects from the slot 29 into an opening in valve-stem 31, which is located in the opening 30 in shaft 17 and is capable of reciprocating therein. By reason of valve 26 and its stem 31 being connected by the bolt or screw 28, as just described, same are caused to rotate with shaft 17, and whenever the valve 26 is moved longitudinally on shaft 17, the bolt or screw 28 causes the stem 31 to move with said valve, or vice versa. The stem 31 extends from the end of shaft 17 and the end thereof bears against the end of a screw-threaded rod 32, which passes through a screw-threaded opening in bracket 33, said bracket being secured to one of the bearings 19 by a set-screw 34 or other suitable means, and said rod having a hand-wheel 35 secured thereto to afford a means for turning same. The seeds within the delinting chamber 12 press against the face of valve 26 and thereby tend to move said valve away from the opening 23, in order to allow the delinted seeds to pass from the delinting chamber 12 into the discharge spout 22. Such movement of valve 26 is limited by the engagement of its stem 31 with the end of rod 32, and by means of said rod the valve 26 can be adjusted with respect to the opening 23, in order to allow the delinted seeds to discharge faster or slower from the delinting chamber 12, as may be desired. Said discharge spout 22 is provided with a sight-hole 36 through which the interior of said spout can be observed from outside the machine. The delinted seeds discharge from the spout 22 into a suitable receptacle or conveying means (not shown).

A cylinder 37, which is preferably formed of a metal tube, is rigidly mounted on the drive shaft 17 by means of heads 38, and extends substantially from one end of the delinting chamber 12 to the other end thereof. Said cylinder 37 is relatively smaller in diameter than the cylinders 9 and is, also, screw-threaded externally and the periphery of the screw-threads is serrated so as to form teeth 14 which are adapted to remove the lint or fibers from the seeds that come in contact with said cylinder.

The screw-threads on cylinder 37 are, also, formed with a relatively large pitch, and slant in the same direction as the screw-threads on the cylinders 9. By this arrangement, as the cylinder 37 rotates in the same direction as the cylinders 9, the screw-threads on the former, also, have a tendency to feed the seeds from the receiving end to the discharge end of the delinting chamber.

While it is preferable to drive the cylinders 9 in the same direction as the cylinder 37 by means of the internal gear 18, yet it should be understood that said cylinders 9 may be driven in the opposite direction from the cylinder 37 as in my above-mentioned companion application, in which event, the screw-threads on cylinder 37 may slant in the opposite direction from the screw-threads on cylinders 9, so that the screw-threads on said cylinders 9 and 37 have a tendency to move the seeds through the delinting chamber.

The staves 11 are located between the cylinders 9, in order to retain the seeds in the delinting chamber 12, one of said staves being arranged to close the top, another to close the bottom, and the others to close the sides of said delinting chamber, being preferably spaced at substantially equal distances from said cylinder 37. Each stave 11 is preferably formed of a plate which may be secured to a bar 39 by any suitable means, or, if desired, may be formed integrally with said bar. Said bar 39 extends from end to end of the machine, and has its ends supported and held firmly in pillow-blocks 40 supported by heads 4, as described and illustrated in my above-mentioned companion application, so that same can be readily adjusted. A blade 41, which extends longitudinally of stave 11, is preferably riveted or otherwise secured to the inner face of said stave, i. e., the face that is exposed to the delinting chamber 12, and a plate 42, which, also, extends longitudinally of said stave, is detachably and adjustably secured to the outer face of said stave by any suitable means (not shown) so that same can be adjusted transversely of said plate 42. Each stave 11 occupies an inclined position, and is so adjusted that the beveled edge of its blade 41 nearly touches the teeth 14 on an adjacent delinting cylinder 9, so as to deflect the seeds from said cylinder, and its plate 42 is adjusted so that an edge thereof nearly touches the teeth 14 of another cylinder 9 adjacent thereto, in order to prevent the seeds from falling out of the chamber 12, said cylinders 9 being rotated so that the cylinder 9 adjacent the blade 41 moves the seeds toward said blade, and the cylinder adjacent the plate 42 moves the seeds away from said plate.

A shaft 43 is preferably arranged to extend from end to end of the machine and is journaled in a bearing 44 borne by one of the heads 4 and, also in a bracket 45, which is bolted or otherwise secured to the other head 4, being located above the upper stave 11 and having a member 46 or a plurality of such members mounted thereon so as to rotate therewith. Each member 46 is provided with a plurality of arms 47 to which the blades or plates 48 are riveted or otherwise secured. A pulley 49 borne by drive shaft 17 drives a belt 50, which, in turn, drives a pulley 51 rigidly mounted on shaft 43, thereby rotating said shaft 43, and causing the blades 48 to fan or blow the lint away from the upper stave 11. By this arrangement, the lint is prevented from accumulating on top of the upper stave 11, in the space between the upper cylinders 9. The operation of the machine is as follows: Power is applied to the drive shaft 17 from any suitable source, so as to cause the cylinder 37 to rotate therewith and, also, to rotate the cylinders 9 through the intermediation of gears 15 and 18. The seeds to be delinted are fed into the receiving spout 20 and are then caused by the pressure of screw 25 to pass through the opening 21 into the delinting chamber 12 and to travel toward the valve 26, so as to fill the space around the cylinder 37. The teeth 14 borne by the cylinders 9 and 37 not only remove the lint and fiber from the seeds, but, also, agitate the seeds within the chamber 12, with the result that, while the seeds are being fed through the delinting chamber 12 by the screw 25, the agitation of the seeds by the cylinders 9 and 37, cause each seed to come in contact with one or more of the cylinders 9 or with the cylinder 37, thus removing all the short fibers or lint from each seed that passes through the delinting chamber. The pressure of the seeds within the delinting chamber 12 holds the valve 26 open and thereby allows the delinted seeds to escape from said delinting chamber into the discharge spout 22. The lint or fiber that is scraped off the seeds by the teeth 14 on the delinting cylinders 9 drops from said cylinders into the bottom of the casing, and is then drawn away through the suction-pipe 8. The suction from pipe 8 causes the lint that is scraped off the seeds by the teeth 14 on the cylinder 37 to escape from the delinting chamber 12 into the bottom of the casing 1 and then to discharge through the suction-pipe 8.

I claim:

1. A delinting machine having a delinting chamber, a plurality of delinting cylinders forming a portion of the wall of said chamber, and being externally screw-threaded to assist in the feeding of the seeds through said chamber, and the threads on said cylinders being of relatively large pitch to feed the seeds and being serrated to remove the lint and fiber from the seeds, and a rotary delinting member within said chamber.

2. A delinting machine having a delinting chamber, a plurality of delinting cylinders forming a portion of the wall of said chamber and being externally screw-threaded, the threads being of relatively large pitch to assist in the feeding of the seeds through said chamber, and a delinting cylinder within said chamber also externally screw-threaded and having its threads of relatively large pitch to assist in feeding the seeds through said chamber, the threads on each cylinder being serrated to remove the lint and fiber from the seeds.

3. In a delinting machine in combination with a plurality of spaced rotatable delinting cylinders, and means to close the spaces between said cylinders, said cylinders and closing means forming the walls of a delinting chamber, a rotatable delinting cylinder in the center of said chamber, a fan located above the uppermost of said closing means, and means to rotate said fan and all of the said delinting cylinders in unison.

4. In a delinting machine, in combination with a plurality of spaced rotatable delinting cylinders, and means to close the spaces between the cylinders, a rotatable delinting cylinder arranged substantially in the center of said space, a fan located above the upper of said closing means, means to rotate said central cylinder and therewith the first mentioned cylinders, and means operated by the means for rotating said central cylinder to actuate the fan.

5. In a delinting machine, in combination with a plurality of spaced rotatable delinting cylinders, and means to close the spaces between the cylinders, a rotatable delinting cylinder arranged substantially in the center of said space, means above one of said closing means to prevent the accumulation of lint on the latter, means to rotate said central cylinder and therewith the first mentioned cylinders, and means operated by the means for rotating said central cylinder to actuate the means for preventing the accumulation of lint.

In testimony whereof I hereunto affix my signature in the presence of two witnesses.

JOSEPH D. MULLEN.

Witnesses:
GEORGE G. ANDERSON,
HARRY H. REISS.